(12) United States Patent
Salter et al.

(10) Patent No.: US 9,112,602 B2
(45) Date of Patent: Aug. 18, 2015

(54) METHOD OF AUTOMATICALLY DETERMINING LINK SPEED FOR A MULTISPEED FIBER LINK MODULE

(75) Inventors: Aaron K. Salter, Hillsboro, OR (US); Peter P. Waskiewicz, Jr., Hillsboro, OR (US); Scott P. Dubal, Beaverton, OR (US); Brian Kantor, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 953 days.

(21) Appl. No.: 12/823,882

(22) Filed: Jun. 25, 2010

(65) Prior Publication Data

US 2011/0320618 A1    Dec. 29, 2011

(51) Int. Cl.
*H04B 10/073* (2013.01)
*G06F 15/16* (2006.01)

(52) U.S. Cl.
CPC .................. *H04B 10/0731* (2013.01)

(58) Field of Classification Search
CPC .................................................. H04B 10/0731
See application file for complete search history.

(56) References Cited

U.S. PATENT DOCUMENTS

| | | | |
|---|---|---|---|
| 2005/0163457 A1* | 7/2005 | Liu et al. | 385/147 |
| 2009/0110390 A1* | 4/2009 | Tosetti et al. | 398/16 |
| 2009/0119426 A1* | 5/2009 | Engelen et al. | 710/71 |

OTHER PUBLICATIONS

"Optical Implementation Using IEEE-1394.b." Texas Instruments. Application Report SGZA001A. Mar. 2004. 10 pages.

* cited by examiner

*Primary Examiner* — Suraj Joshi
(74) *Attorney, Agent, or Firm* — Law Office of R. Alan Burnett, P.S.

(57) ABSTRACT

Automatically determining a link speed between link partners using a multispeed fiber module. An embodiment solves the problem of how to determine the highest common link speed between short range (SR)/long range (LR) fiber link partners when at least one of the link partners is using a multispeed fiber module. In an embodiment, a multispeed fiber module comprises a module that is capable of both 10 gigabit (GB) per second Ethernet and 1 GB per second Ethernet or lesser data transfer speeds over a fiber optical link. In an embodiment, the method comprises trying each link speed in a known succession, from highest supported speed to lowest supported speed. In an embodiment, an initiator link partner "blinks" a transmit laser, which alerts the link partners that a link speed determination session is being initiated. By automatically determining link speed, the user is relieved of the necessity to manually configure the link speed.

16 Claims, 3 Drawing Sheets

METHOD OF AUTOMATICALLY DETERMINING LINK SPEED FOR A MULTISPEED FIBER LINK MODULE

BACKGROUND

1. Field

The present invention relates generally to computer networking and, more specifically, to automatically determining link speed between link partners using multi-speed fiber modules.

2. Description

Difficulties exist in some computing systems for exchanging link speed capabilities between partners. When each link partner supports only one, and the same, communications speed, there is no problem. However, in some cases, a network interface controller (NIC) or switch may include a multispeed fiber module. A multispeed fiber module is a module that is capable of two or more communications link speeds over a fiber optic link. A multispeed fiber module has no way to automatically determine the highest common link speed that can be used with its link partner. The link partners may either fail to establish a link at the highest common speed, or fail to establish a link at all. This problem is currently solved by requiring a computer system user to force the desired link speed manually on each link partner. In a case where the user does not have access to each link partner's configuration settings, it may not be possible for the user to force the link speed setting, thus reducing performance of the network devices.

BRIEF DESCRIPTION OF THE DRAWINGS

The features and advantages of the present invention will become apparent from the following detailed description of the present invention in which.

DETAILED DESCRIPTION

An embodiment of the present invention comprises a method of automatically determining a link speed between link partners using a multispeed fiber module. An embodiment solves the problem of how to determine the highest common link speed between short range (SR) or long range (LR) fiber link partners when at least one of the link partners is using a multispeed fiber module. In an embodiment, a multispeed fiber module comprises a module that is capable of both 10 gigabit (GB) per second Ethernet and 1 GB per second Ethernet or lesser data transfer speeds over a fiber optical link. In other embodiments, other data transfer speeds, either higher or lower than 1 GB/s and 10 GB/s, may be used. In an embodiment, the method comprises trying each link speed in a known succession, from highest supported speed to lowest supported speed. In an embodiment, an initiator link partner "blinks" a transmit laser, which alerts the link partners that a link speed determination session is being initiated. By automatically determining link speed, the user is relieved of the necessity to manually configure the link speed.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Figure 1:
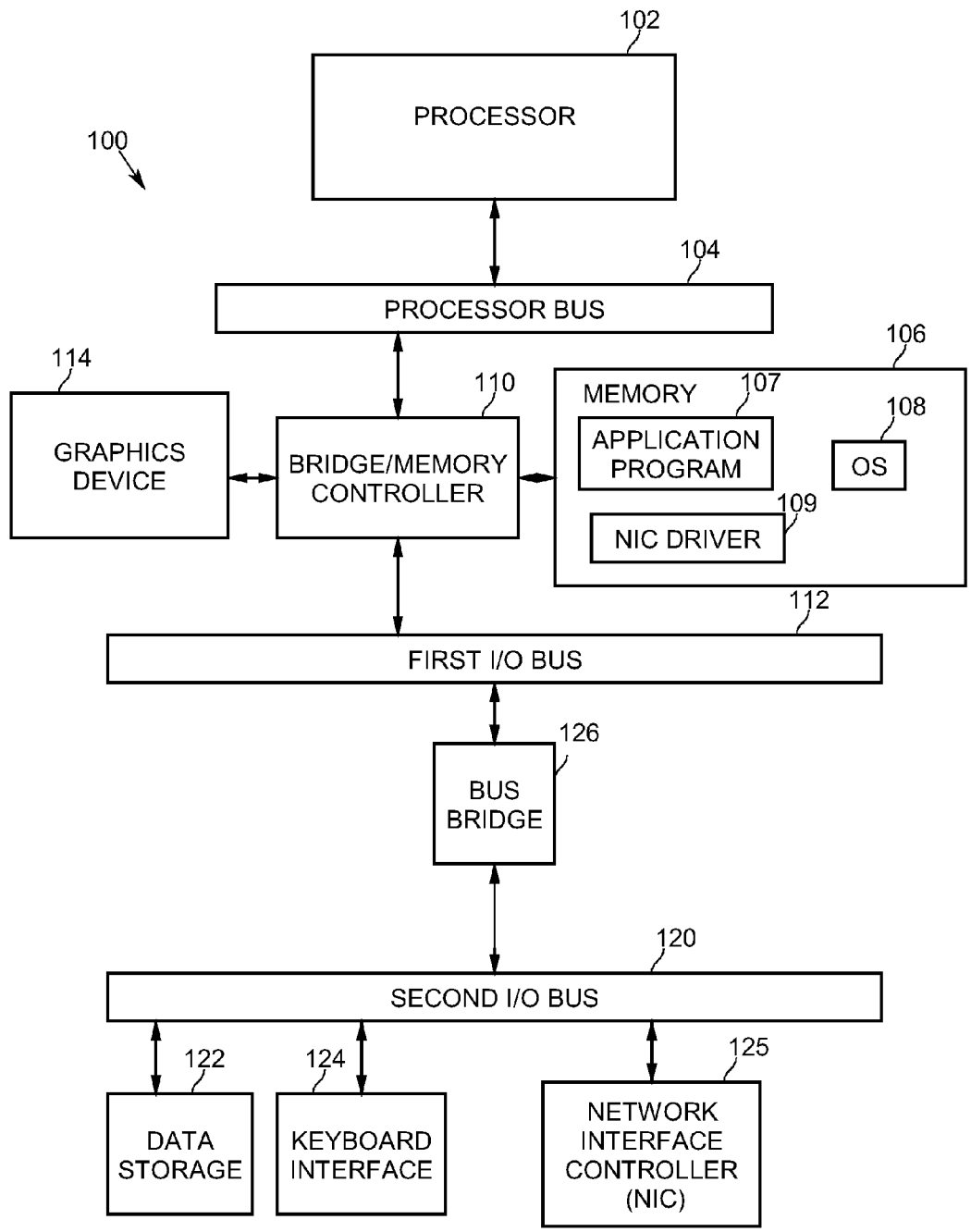
FIG. 1 is a diagram illustrating a processing system according to an embodiment of the present invention.

An exemplary processing system for embodiments of the present invention is shown in FIG. 1, however, other systems may also be used and not all components of the processing system shown are required for the present invention. Sample system 100 may be used, for example, to execute the processing for embodiments of the present invention. Sample system 100 is representative of processing systems based on the PENTIUM®, CORE®, CORE DUO®, or Celeron® family of processors available from Intel Corporation, although other systems (including personal computers (PCs) or servers having other processors, engineering workstations, other set-top boxes, and the like) and architectures may also be used.

FIG. 1 is a block diagram of a system 100 of one embodiment of the present invention. The system 100 includes a processor 102 that processes data signals. Processor 102 may have multiple processing cores. Processor 102 may be coupled to a processor bus 104 that transmits data signals between processor 102 and other components in the system 100. System 100 includes a memory 106. Memory 106 may store instructions and/or data represented by data signals that may be executed by processor 102. The instructions and/or data may comprise code for performing any and/or all of the techniques of the present invention. Memory 106 may also contain additional software and/or data such as at least one application program 107 and an operating system (OS) 108. Additionally, memory may store a network interface controller (NIC) driver program 109, which when executed by processor 102, may control the operations of NIC 125. In an embodiment, NIC driver logic may be implemented in hardware circuitry. NIC 125 may be used by the system to communicate with other systems over a network (not shown in FIG. 1). In one embodiment, the NIC may be coupled to a fiber optic link (not shown in FIG. 1).

A bridge/memory controller 110 may be coupled to the processor bus 104 and memory 106. The bridge/memory controller 110 directs data signals between processor 102, memory 106, and other components in the system 100 and bridges the data signals between processor bus 104, memory 106, and a first input/output (I/O) bus 112. In this embodiment, graphics device 114 interfaces to a display device (not shown) for displaying images rendered or otherwise processed by the graphics device 114 to a user. First I/O bus 112 may comprise a single bus or a combination of multiple buses. First I/O bus 112 provides communication links between components in system 100. In another embodiment, portions of the bridge/memory controller may be integrated with the processor, and portions of the bridge/memory controller and the first I/O bus may be integrated into a platform control hub (PCH).

A second I/O bus 120 may comprise a single bus or a combination of multiple buses. The second I/O bus 120 provides communication links between components in system 100. A data storage device 122 may be coupled to the second I/O bus 120. A keyboard interface 124 may be coupled to the second I/O bus 120. A bus bridge 126 couples first I/O bridge 112 to second I/O bridge 120.

Embodiments of the present invention are related to the use of the system 100 as a component in a processing system. According to one embodiment, such processing may be performed by the system 100 in response to processor 102 executing sequences of instructions in memory 106. Such instructions may be read into memory 106 from another computer-readable medium, such as data storage device 122, for example. Execution of the sequences of instructions causes processor 102 to execute processing for the application according to embodiments of the present invention. In an alternative embodiment, hardware circuitry may be used in place of or in combination with software instructions to implement portions of embodiments of the present invention. Thus, the present invention is not limited to any specific combination of hardware circuitry and software.

The elements of system 100 perform their conventional functions in a manner well-known in the art. In particular, data storage device 122 may be used to provide long-term storage for the executable instructions and data structures for embodiments of components in accordance with the present invention, whereas memory 106 is used to store on a shorter term basis the executable instructions of embodiments of components in accordance with the present invention during execution by processor 102.

NIC 125 comprises a hardware device that handles an interface to a computer network for the processing system. The NIC has a read-only memory (ROM) that store a unique number called a media access control (MAC) address. The MAC address uniquely identifies the processing system on the network. In an embodiment, the NIC communicates via the Ethernet communications protocol, and supports 1 GB/s Ethernet and 10 GB/s Ethernet communications as specified in Institute of Electrical and Electronics Engineers (IEEE) standard 802.3ae-2002. Ethernet is a well known standard family of frame-based computer networking technologies for local area networks (LANs). In other embodiments, other communications protocols and standards may be used. In an embodiment, the NIC supports communications over a fiber optic link.

Figure 2:
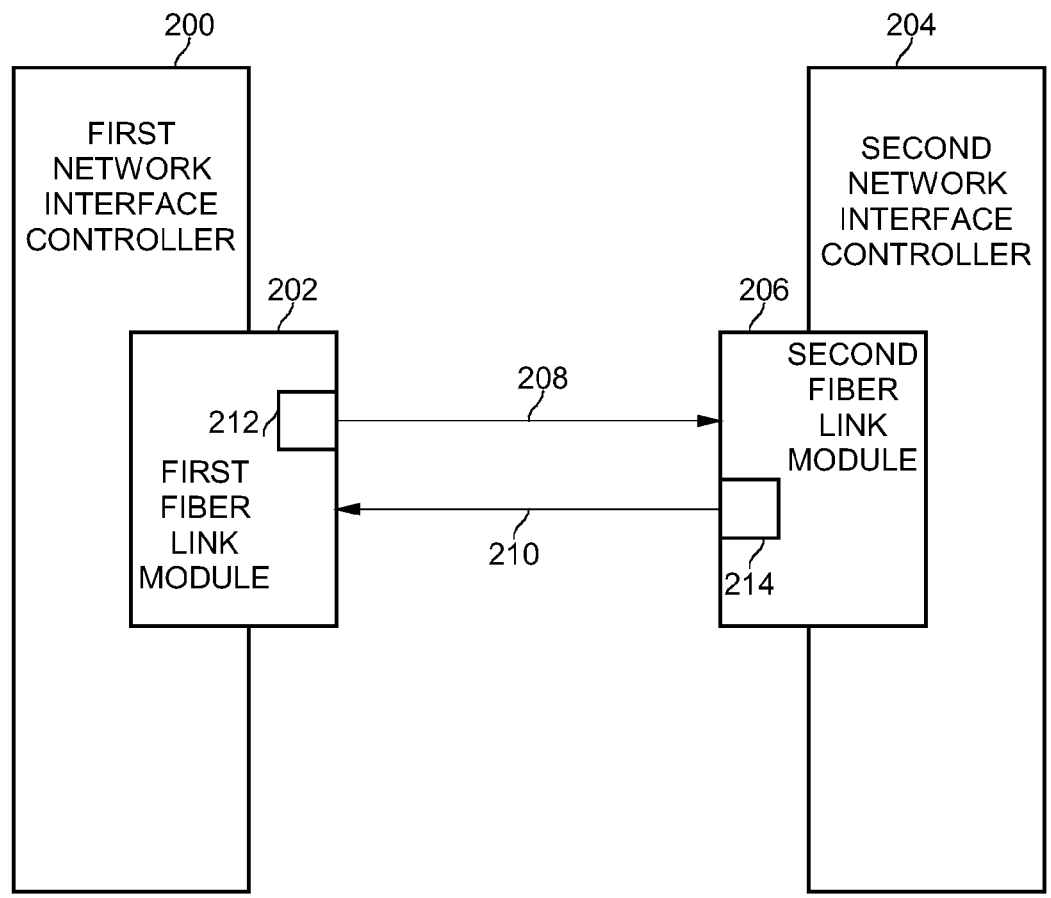
FIG. 2 is a diagram illustrating two network interface controllers having fiber link modules and a fiber link according to an embodiment of the present invention.

FIG. 2 is a diagram illustrating two network interface controllers having fiber link modules and a fiber link according to an embodiment of the present invention. A first network interface controller (NIC) 200 may be a part of a processing system as shown in FIG. 1. A second NIC 204 may be a part of another component that the processing system is to communicate with over a computer network. The computer network may be, at least in part, embodied in a pair of fiber links 208, 210. In this example, fiber link 208 transmits data from a first fiber link module 202, which is a part of first NIC 200, to a second fiber link module 206, which is a part of second NIC 204. Fiber link 210 transmits data from the second fiber link module 204 to the first fiber link module 202. In an embodiment, at least the first fiber link module has dual ports, that is, the module can transmit data on a first link, and receive data on a second link. In an embodiment, the second fiber link module also includes a dual port. First fiber link module 302 comprises transmit (TX) laser 212, and second fiber link module may comprise TX laser 214. In an embodiment, second NIC 204 may be a switch, router, or any other computer networking component capable of communicating over a network using a networking protocol such as Ethernet. In an embodiment, NIC driver 109, when executed by processor 102, may control the operation of first NIC 200, and may direct the first NIC to cause the first fiber link module 202 to perform actions as described herein.

When processing system 100 starts up, or at a later point in time as required (for example, when a NIC is disconnected and reconnected), first NIC 200 may be configured to support subsequent requests for data transfers over the fiber links. In an embodiment, first NIC 202 supports multiple speeds of data transfers, such as a first data transfer speed of 10 GB/s Ethernet and second data transfer speed of 1 GB/s Ethernet. In an embodiment, second NIC 204 may support data transfers at 1 GB/s Ethernet. In an embodiment, second NIC 204 may support data transfers at 10 GB/s Ethernet. In an embodiment, second NIC 204 may support data transfers at either 1 GB/s and 10 GB/s Ethernet. In an embodiment, second NIC 204 may support data transfers at a higher or lower speed than 10 GB/s Ethernet. In an embodiment, NIC driver 109 determines at which speed to transfer data between first NIC 202 and second NIC 204. Once the NICs are configured according to the determined speed, requests for data transfer between the devices may be accomplished at that speed.

Figure 3:
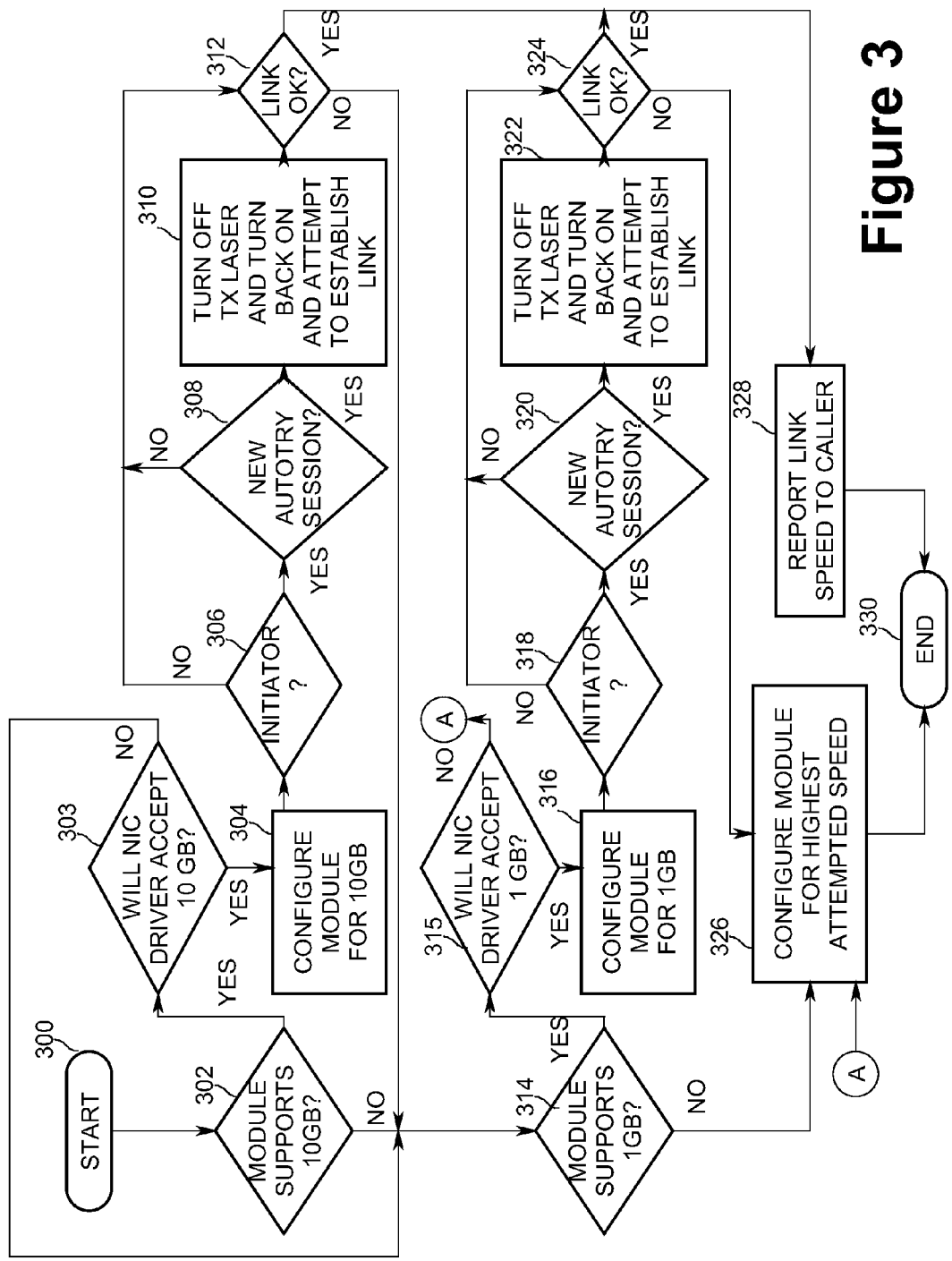
FIG. 3 is a flow diagram illustrating automatically determining link speed according to an embodiment of the present invention.

FIG. 3 is a flow diagram illustrating automatically determining link speed according to an embodiment of the present invention. After start 300, NIC driver 109, executing on the processing system, determines if the first fiber link module supports data transfers at a first speed, such as 10 GB/s Ethernet, at block 302. If the first fiber link module does support data transfers at 10 GB/s Ethernet, the NIC driver determines at block 303 if it will accept 10 GB/s as a configuration setting. If so, the NIC driver may configure the first fiber link module for 10 GB/s Ethernet data transfers at block 304. In one embodiment, the NIC driver instructs the NIC to write a 0 (indicating 10 GB/s) to a selected pin of the first fiber link module to select the link speed. Next, at block 306, the NIC driver determines if the first fiber link module is the initiator for a link determination session. The link determination session may be known as an "auto-try" session. If so, the NIC driver determines if this is a new auto-try session at block 308. If it is, then the NIC driver causes the first fiber link module to turn TX laser 212 off and immediately back on again (i.e., to "blink" the laser) at block 310 to signal to the second fiber link module that an attempt to establish the link is being made. At block 312, if the communications link was established at the first speed (e.g., 10 GB/s) as a result of turning the TX laser off and back on again and the resulting attempt to establish the link at block 310, then processing continues with the NIC driver reporting the established link speed (10 GB/s Ethernet in this case) to the caller of the NIC driver at block 328 and processing ends at block 330.

If the NIC driver will not accept 10 GB/s at block 303, then processing continues at block 314. If the first fiber link module is not the initiator at block 306, then processing continues at block 312. If the NIC driver determined that this is not a new auto-try session at block 308, then processing continues at block 312. If the link was not established at block 310, processing continues with block 314. If the first fiber link module does not support the first speed (such as 10 GB/s Ethernet) at block 302, then processing continues at block 314.

At block 314, NIC driver 109 determines if the first fiber link module supports data transfers at a second speed, such as 1 GB/s Ethernet, the second speed being slower than the first speed. If the first fiber link module does support data transfers at the second speed of 1 GB/s Ethernet, the NIC driver determines at block 315 if it will accept 1 GB/s as a configuration setting. If so, the NIC driver may configure the first fiber link module for 1 GB/s Ethernet data transfers at block 316. In one embodiment, the NIC driver instructs the NIC to write a 1 (indicating 1 GB/s) to a selected pin of the first fiber link module to select the link speed. Next, at block 318, the NIC driver determines if the first fiber link module is the initiator for the auto-try session. If so, the NIC driver determines if this is a new auto-try session at block 320. If it is, then the NIC driver causes the first fiber link module to turn the TX laser 212 off and immediately back on again (i.e., to "blink" the laser) at block 322 to signal to the second fiber link module that an attempt to establish the link is being made. At block 324, if the link was established at the second speed (i.e., 1 GB/s) as a result of turning the TX laser off and back on again and the resulting attempt to establish the link at block 322, then processing continues with the NIC driver reporting the link speed (1 GB/s Ethernet in this case) to the caller of the NIC driver at block 328 and processing ends at block 330. Hence, a link may be tried at the higher speed first, following by a try at the lower speed if the higher speed failed, according to one embodiment.

If the NIC driver will not accept 1 GB/s at block 315, then processing continues at block 326. If the first fiber link module is not the initiator at block 318, then processing continues at block 324. If the NIC driver determined that this is not a new auto-try session at block 320, then processing continues at block 324. If the link was not established at block 322, processing continues with block 326.

If the first fiber link module does not support the second speed (such as 1 GB/s Ethernet) at block 314, then processing continues at block 326. At block 326, the NIC driver configures the first fiber link module for the highest attempted speed. There are two criteria for trying a speed, the module has to support it and it has to be acceptable with the NIC driver. First, the NIC driver tells the auto-try process what speeds it will accept. Second, the auto-try process only tries a speed if the NIC driver wants it and if the module supports it. Modules must be in either 10 GB or 1 GB mode. If the link is not established at either speed, the autotry process configures the fiber link module to a known speed before exiting. The process specifically leaves the fiber link module in the highest attempted speed.

In an embodiment, both link partners start the auto-try session to attempt to establish a communications link at the same time. When a non-initiator link partner senses the initiator link partner's TX laser turning off and back on over a receiving fiber link, the non-initiator link partner may start an auto-try session on the non-initiator link partner's transmitting fiber link.

In another embodiment, the two speed approach may be extended to three or more speeds, whereby the NIC driver tries to establish a link at the highest supported speed, then the next highest supported speed, and finally the lowest supported speed.

Embodiments of the present invention provide the ability for a multispeed NIC to interoperate automatically with NICs and switches as link partners at either a first speed or a second speed (such as 1 GB/s Ethernet NICs and switches, and 10 GB/s Ethernet NICs and switches), without user intervention by automatically establishing a communications link between link partners with different capabilities. Embodiments of the present invention also give the NIC the ability to interoperate automatically with an existing installed base of switches using 1 GB/s Ethernet-only fiber link modules or 10 GB/s Ethernet-only fiber link modules. Thus, system administrators may upgrade legacy single speed switches to multispeed modules without the need to physically visit the switches to manually reconfigure the link speed on each individual network client connected to those switches.

Embodiments of the present invention are backward compatible with existing network communications products, which know nothing about the auto-try process. Existing products will sense the TX laser blink as a loss of signal, much as if the user removed and replaced the cable. But an auto-try-enabled product will see the TX laser blink as a signal to begin the auto-try process.

Although the operations described herein may be described as a sequential process, some of the operations may in fact be performed in parallel or concurrently. In addition, in some embodiments the order of the operations may be rearranged without departing from the spirit of the invention.

The techniques described herein are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, set top boxes, cellular telephones and pagers, and other electronic devices, that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various computer system configurations, including multiprocessor systems, minicomputers, mainframe computers, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by a machine and that cause the machine to perform any one of the methods described herein. The term "machine readable medium" shall accordingly include, but not be limited to, solid-state memories, and optical and magnetic disks. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

What is claimed is:

1. A method of automatically determining link speed for a multispeed fiber link module of a network interface controller in a processing system comprising:

determining if the multispeed fiber link module supports a first data transfer speed; and when the multispeed fiber link module supports the first data transfer speed, configuring the multispeed fiber link module to operate at the first data transfer speed, determining if the multispeed fiber link module is an initiator of a link determination session, when the multispeed fiber link module is the initiator, determining if the link determination session is a new link determination session, when the link determination session is new, turning off a transmit laser of the multispeed fiber link module and immediately turning on the transmit laser to signal to a link partner of the multispeed fiber link module to attempt to establish a communications link at the first data transfer speed, the attempt to establish the communication link including attempting to communicate at the first data transfer speed, and when the communications link is established, reporting the first data transfer speed; and if the communications link at the first data transfer speed was not established, determining if the multispeed fiber link module supports a second data transfer speed, configuring the multispeed fiber link module to operate at the second data transfer speed, determining if the multispeed fiber link module is an initiator of a link determination session, when the multispeed fiber link module is the initiator, determining if the link determination session is a new link determination session, when the link determination session is new, turning off the transmit laser of the multispeed fiber link module and immediately turning on the transmit laser to signal to the link partner of the multispeed fiber link module to attempt to establish a communications link at the second data transfer speed, the attempt to establish the communication link including attempting to communicate at the second data transfer speed, and when the communications link is established, reporting the second data transfer speed.

2. The method of claim 1, wherein the first data transfer speed is faster than the second data transfer speed.

3. The method of claim 2, wherein the first data transfer speed is 10 GB per second and the second data transfer speed is 1 GB per second.

4. The method of claim 3, wherein the communications link established by the multispeed fiber link module supports the Ethernet communications protocol.

5. The method of claim 4, further comprising:
when the multispeed fiber link module does not support the second data transfer speed or the communications link at the second data transfer speed was not established, configuring the multispeed fiber link module to a highest attempted speed.

6. The method of claim 5, wherein the link partner supports the first data transfer speed, the second data transfer speed, or both the first and second data transfer speeds.

7. An article comprising: a non-transitory machine readable medium containing instructions, which when executed, automatically determine link speed for a multispeed fiber link module of a network interface controller in a processing system by,
determining if the multispeed fiber link module supports a first data transfer speed; and
when the multispeed fiber link module supports the first data transfer speed, configuring the multispeed fiber link module to operate for operation at the first data transfer speed, determining if the multispeed fiber link module is an initiator of a link determination session, when the multispeed fiber link module is the initiator, determining if the link determination session is a new link determination session, when the link determination session is new, causing the turning off of a transmit laser of the multispeed fiber link module and immediately turning on the transmit laser to signal to a link partner of the multispeed fiber link module to attempt to establish a communications link at the first data transfer speed, the attempt to establish the communication link including attempting to communicate at the first data transfer speed, and when the communications link is established, reporting the first data transfer speed; and if the communications link at the first data transfer speed was not established, determining if the multispeed fiber link module supports a second data transfer speed, configuring the multispeed fiber link module for operation at the second data transfer speed, determining if the multispeed fiber link module is an initiator of a link determination session, when the multispeed fiber link module is the initiator, determining if the link determination session is a new link determination session, when the link determination session is new, causing the turning off of the transmit laser of the multispeed fiber link module and immediately turning on the transmit laser to signal to the link partner of the multispeed fiber link module to attempt to establish a communications link at the second data transfer speed, the attempt to establish the communication link including attempting to communicate at the second data transfer speed, and when the communications link is established, reporting the second data transfer speed.

8. The article of claim 7, wherein the first data transfer speed is faster than the second data transfer speed.

9. The article of claim 8, wherein the first data transfer speed is 10 GB per second and the second data transfer speed is 1 GB per second.

10. The article of claim 9, wherein the communications link established by the multispeed fiber link module supports the Ethernet communications protocol.

11. The article of claim 10, further comprising instructions for:
when the multispeed fiber link module does not support the second data transfer speed or the communications link at the second data transfer speed was not established, configuring the multispeed fiber link module to a highest attempted speed.

12. A system comprising:
a network interface controller (NIC) to communicate over a communications link with a link partner, the NIC including a multispeed fiber link module, the multispeed fiber link module including a transmit laser; and
NIC driver logic to automatically determine a link speed for the multispeed fiber link module by determining if the multispeed fiber link module supports a first data transfer speed; and when the multispeed fiber link module supports the first data transfer speed, configuring the multispeed fiber link module to operate for operation at the first data transfer speed, determining if the multispeed fiber link module is an initiator of a link determination session, when the multispeed fiber link module is the initiator, determining if the link determination session is a new link determination session, when the link determination session is new, causing the turning off of the transmit laser of the multispeed fiber link module and immediately turning on the transmit laser to signal to the link partner of the multispeed fiber link module to attempt to establish the communications link at the first data transfer speed, the attempt to establish the communication link including attempting to communicate at the first data transfer speed, and when the communications link is established, reporting the first data transfer speed; and if the communications link at the first data transfer speed was not established, determine if the multispeed fiber link module supports a second data transfer speed, configure the multispeed fiber link module to operate for operation at the second data transfer speed, determine if the multispeed fiber link module is an initiator of a link determination session, when the multispeed fiber link module is the initiator, determine if the link determination session is a new link determination session, when the link determination session is new, cause the turning off of the transmit laser of the multispeed fiber link module and immediately turning on the transmit laser to signal to the link partner of the multispeed fiber link module to attempt to establish a communications link at the second data transfer speed, the attempt to establish the communication link including attempting to communicate at the second data transfer speed, and when the communications link is established, report the second data transfer speed.

13. The system of claim 12, wherein the first data transfer speed is faster than the second data transfer speed.

14. The system of claim 13, wherein the first data transfer speed is 10 GB per second and the second data transfer speed is 1 GB per second.

15. The system of claim 14, wherein the communications link established by the multispeed fiber link module supports the Ethernet communications protocol.

16. The system of claim 15, wherein the link partner supports the first data transfer speed, the second data transfer speed, or both the first and second data transfer speeds.

* * * * *